(12) United States Patent
Inage

(10) Patent No.: US 6,641,040 B2
(45) Date of Patent: Nov. 4, 2003

(54) METHOD AND APPARATUS FOR IMAGE READING THAT INCLUDES AN EFFECTIVE GROUNDING

(75) Inventor: Osamu Inage, Ohta-ku (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/042,255

(22) Filed: Jan. 11, 2002

(65) Prior Publication Data

US 2002/0092909 A1 Jul. 18, 2002

(30) Foreign Application Priority Data

Jan. 12, 2001 (JP) ........................................ 2001-004338

(51) Int. Cl.⁷ ................................................ G06K 7/10
(52) U.S. Cl. ......................... 235/454; 355/41; 358/474
(58) Field of Search ........................ 235/454; 358/474; 355/41

(56) References Cited

U.S. PATENT DOCUMENTS

| | | | | |
|---|---|---|---|---|
| 3,840,840 A | * | 10/1974 | Worth | 439/399 |
| 4,094,564 A | * | 6/1978 | Cacolici | 439/456 |
| 4,774,550 A | * | 9/1988 | Igarashi | 280/11.36 |
| 4,873,579 A | * | 10/1989 | Kubota et al. | 358/471 |
| 5,883,987 A | * | 3/1999 | Ogoshi et al. | 382/312 |
| 5,953,133 A | * | 9/1999 | Fujimiya et al. | 358/474 |
| 6,204,936 B1 | * | 3/2001 | Ishizuka | 358/474 |

* cited by examiner

*Primary Examiner*—Michael G. Lee
*Assistant Examiner*—Kumiko C. Koyama
(74) *Attorney, Agent, or Firm*—Oblon, Spivak, McClelland, Maier & Neustadt, P.C.

(57) ABSTRACT

An image reading apparatus includes a frame, a light source, a photo-electronic converting element, and a flexible plate. The frame is activated for a reciprocating movement. The light source emits light to irradiate an image surface of an original and is held by the frame. The photo-electronic converting element receives the light emitted by the light source and which is reflected by the image surface of the original. In addition, the photo-electronic converting element converts the light to an analog image signal. The flexible plate includes a first printed wire for applying a driving voltage to the light source, and a second printed wire for establishing a ground to the frame.

9 Claims, 3 Drawing Sheets

METHOD AND APPARATUS FOR IMAGE READING THAT INCLUDES AN EFFECTIVE GROUNDING

CROSS-REFERENCE TO A RELATED APPLICATION

This application is based on Japanese patent application, No. JPAP2001-004338 filed on Jan. 12, 2001, in the Japanese Patent Office, the entire contents of which are incorporated by reference herein.

BACKGROUND OF THE INVENTION

1. Field of the Invention

The present invention relates to a method and apparatus for reading an image, and more particularly to a method and apparatus for providing effective grounding to eliminate or reduce unwanted electromagnetic interference occurring in driving a light source of an image reading apparatus.

2. Discussion of the Background

Conventionally, image reading apparatuses (such as scanners, etc.) drive a light source with a driving voltage having a sign waveform by using a driving voltage generator (e.g., a light source stabilizing apparatus) connected to the light source through a flexible printed wiring plate. This driving method does not result in a substantial amount of EMI (electromagnetic interference).

However, a pulse-wave form driving voltage is now commonly used because a light source driven with a pulse-waveform generates a larger amount of light. A problem with this type of method is unwanted radio noise (EMI) occurs because the pulse-waveform driving voltage has a steep change in its waveform. Therefore, it is difficult to suppress the amount of radio noises to meet certain EMI requirements.

One attempt to reduce unwanted radio noises occurring with the pulse-waveform driving method is to shorten a distance between the light source and the driving voltage generator by mounting the driving voltage generator to a frame or a carriage holding the light source.

However, mounting the voltage generator in this way increases a total weight of the frame or the carriage. Further, the load required by the motor to drive the frame or the carriage is increased. Accordingly, a motor with a larger torque is needed, which also increases the amount of electricity needed to drive the motor. In addition, the cost of the motor and the power consumption is also increased.

SUMMARY OF THE INVENTION

Accordingly, one object of the present invention is to solve the above-noted and other problems.

Another object of the present invention is to provide a novel image reading apparatus and method that is reduced in size and cost, and that reduces unwanted radio noise to meet certain EMI requirements.

The present invention solves these and other objects by providing a novel image reading apparatus including a frame for moving in a reciprocating fashion, a light source held by the frame for emitting light so as to irradiate an image surface of an original, and a photo-electronic converting element for receiving the light reflected by the image surface of the original and for converting the received light into an analog image signal. Also included is a flexible plate having a first printed wire for applying a driving voltage to the light source, and having a second printed wire for establishing a ground to the frame. The present invention also provides a novel image reading method.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF PREFERRED EMBODIMENTS

Figure 1:
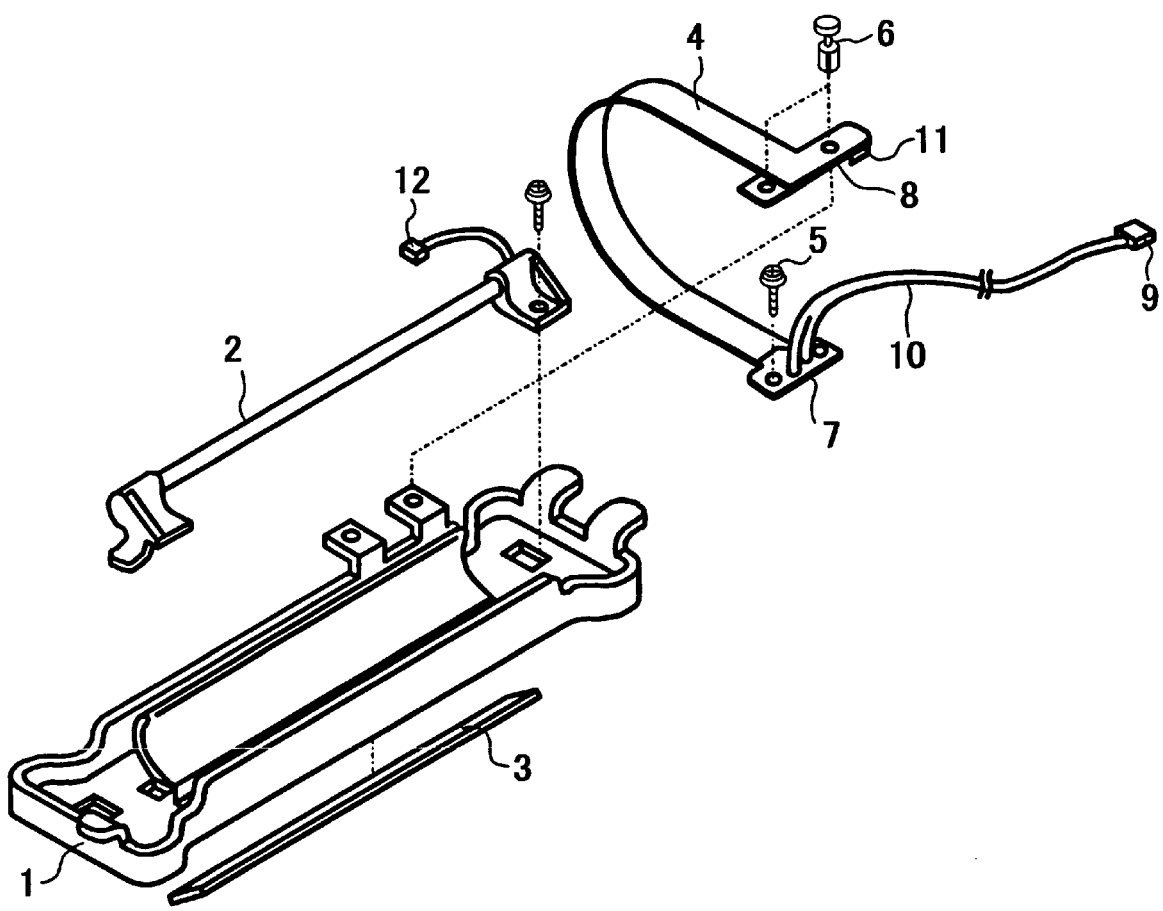
FIG. 1 is an exploded perspective view of a portion of an image reading apparatus according to a preferred embodiment.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referring now to the drawings, wherein like reference numerals designate identical or corresponding parts throughout the several views, and more particularly to FIG. 1 thereof, a light source carriage mechanism of an image reading apparatus according to a preferred embodiment of this patent specification will be described.

As shown, the image reading apparatus includes a frame 1 which is mounted on rails (not shown) disposed in parallel to a contact glass (not shown). The frame 1 carries a light source 2 and a mirror 3 and is moved back and forth on the rails with a motor (not shown). The light source 2 emits light so as to irradiate an image surface of an original and the mirror 3 reflects light reflected by an image surface of the original. The light reflected by the mirror 3 is then reflected by two mirrors mounted to another frame (not shown), which moves in the same direction as the frame 1, but at a speed twice as fast as the frame 1. The light is then received by a photo-electronic converting element (not shown) and is converted into an analog image signal.

Figure 2A:
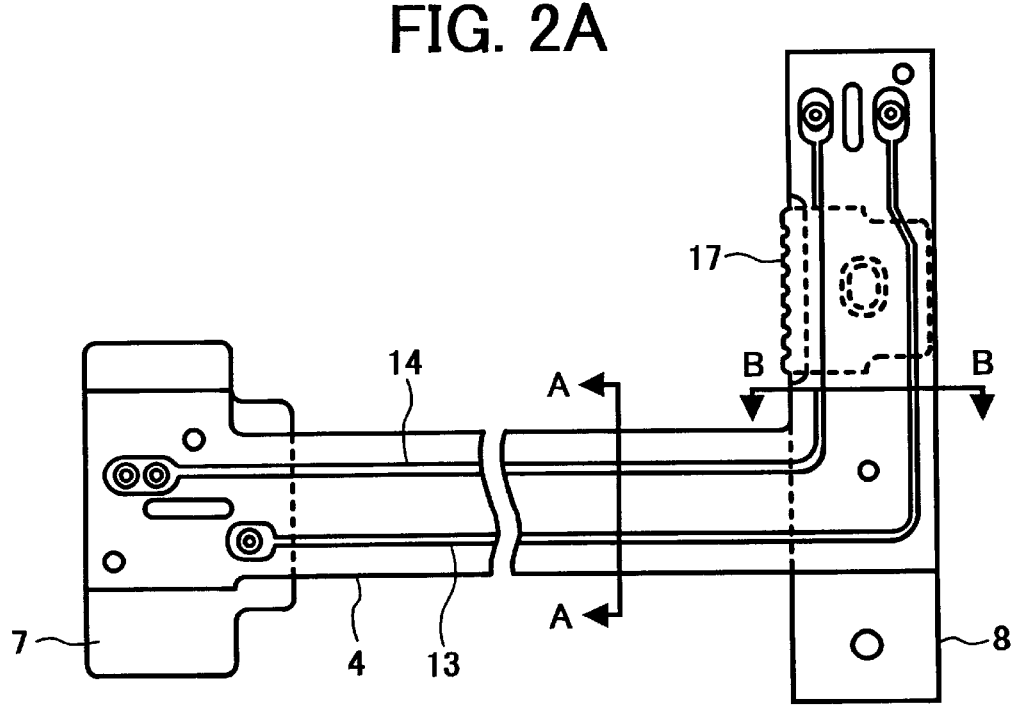
FIG. 2A is a schematic top view of a flexible printed wiring plate with associated components included in the portion of the image reading apparatus shown in FIG. 1.
Figure 2B:
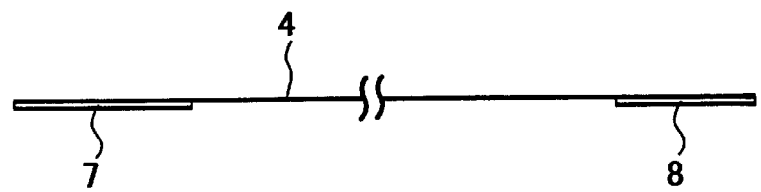
FIG. 2B is a schematic front view of the flexible printed wiring plate of FIG. 2A.

The image reading apparatus also includes a flexible printed wiring plate 4 for applying a driving voltage to the light source 2. Note, a top view of the flexible printed wiring plate 4 is shown in FIG. 2A, and a front view is shown in FIG. 2B. As shown in FIG. 1, the flexible printed wiring plate 4 has a first end fixed with a screw 5 to a base card (not shown) of the image reading apparatus and a second end fixed with a stopper 6 to the frame 1.

Figure 3:
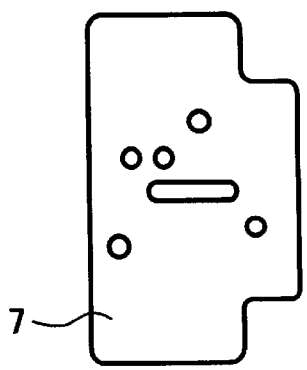
FIG. 3 is a schematic top view of a supporting plate.
Figure 4:
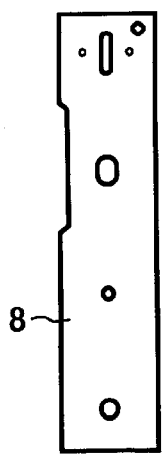
FIG. 4 is a schematic top view of another supporting plate.

Because the flexible printed wiring plate 4 is somewhat fragile, it is preferable the wiring plate is properly secured and protected at portions such as the first and second ends. Therefore, a supporting plate 7 (see FIG. 3) is provided at the first end and a supporting plate 8 (see FIG. 4) is provided at the second end (see also FIG. 1). Further, the supporting plates 7 and 8 have a sufficient rigidity to properly secure and protect the wiring plate 4.

Referring again to FIG. 1, the flexible printed wiring plate 4 is connected with a wire harness 10 having a connector 9. A first end of the wire harness 10 is connected to the flexible printed wiring plate 4 via the supporting plate 7. Further, the connector 9 is connected to a driving voltage generator (not shown), such as a light source stabilizing apparatus, for generating a pulse-waveform driving voltage to be applied to the light source 2.

In addition, the wiring plate 4 is connected to the light source 2 via connectors 11, 12. In more detail, the connector 11 is fixed to the supporting plate 8 (e.g., by soldering, etc.), and the connector 12 attached to the light source 2 is plugged into the connector 11.

Figure 5:
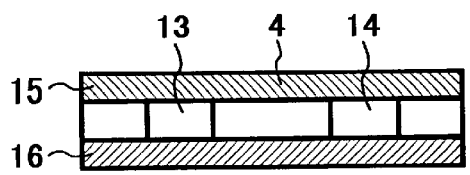
FIG. 5 is a cross-sectional view taken on line A—A of FIG. 2A.

Further, as shown in FIG. 2A, the wiring plate 4 includes a high voltage printed pattern 13 and a grounding printed pattern 14. The printed patterns 13 and 14 are covered by surface coating layers 15 and 16, as illustrated in the cross-sectional view of FIG. 5 taken on line A—A of FIG. 2A.

Figure 6:
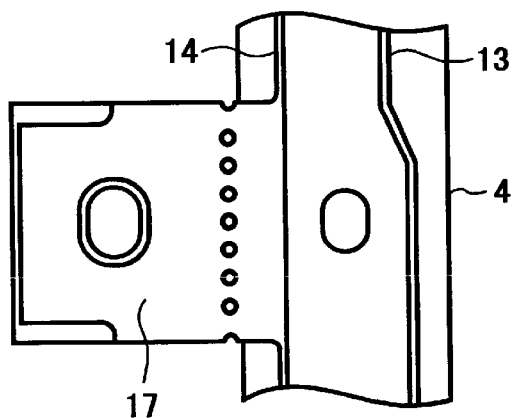
FIG. 6 is a schematic front view of the flexible printed wiring plate with a grounding portion.
Figure 7:
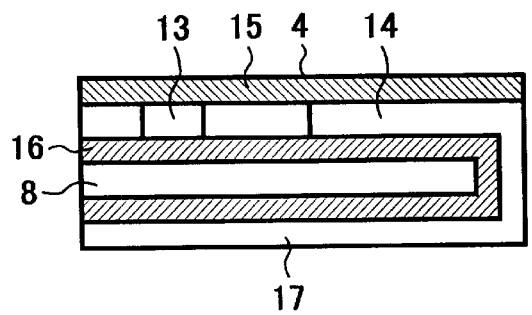
FIG. 7 is a cross-sectional view taken on line B—B of FIG. 2A.

In addition, as shown in FIG. 6, the wiring plate 4 also includes a grounding portion 17 integrated with the grounding printed pattern 14. The grounding portion 17 is folded so as to wrap around the supporting plate 8, thereby covering a surface of the supporting plate 8 facing the frame 1, as illustrated in the cross-sectional view of FIG. 7 taken on line B—B of FIG. 2A.

Additionally, the grounding portion 17 has a relatively large surface area so as to provide sufficient contact with the frame 1 when the second end of the wiring plate 4 is fixed to the frame 1. Thus, sufficient grounding is achieved with the flexible printed wiring plate 4. The frame 1 is also electrically connected to the image reading apparatus via the rails (not shown).

In the image reading apparatus having the above-described structure, the pulse-waveform driving voltage generated by the driving voltage generator is applied to the light source 2 via the wire harness 10 and the flexible printed wiring plate 4. Thus, according to the present invention radio noise generated by application of the driving voltage to the light source 2 flows through the grounding portion 17 and are dissipated to the image reading apparatus via the frame 1 and rails. Because this structure efficiently functions as an EMI countermeasure around the light source 2, the image reading apparatus according to the present invention suppresses the degradation of an image reading accuracy due to radio noise.

Further, because the grounding portion 17 integrated with the grounding printed pattern 14 contacts the frame 1 with a relatively large surface area, effective grounding is accomplished. Additionally, when the flexible printed wiring plate 4 is fixed to the frame 1, the grounding portion 17 is forced to firmly contact the frame 1. Therefore, the necessary grounding is established in an effective manner.

In addition, because sufficient grounding is achieved via the wiring plate 4, the driving voltage generator does not have to be mounted to the frame 1 at a position close to the light source 2 to provide the necessary protection (as is done in the background image reading apparatus). Accordingly, a relatively low cost and compact driving mechanism (e.g., a motor) can be used to drive the frame 1.

Further, numerous additional modifications and variations are possible in light of the above teachings. It is therefore to be understood that within the scope of the appended claims, the disclosure of this patent specification may be practiced otherwise than as specifically described herein.

What is claimed is:

1. An image reading apparatus, comprising:

a frame configured to move in a reciprocating fashion;

a light source held by the frame and configured to emit light so as to irradiate an image surface of an original;

a photo-electronic converting element configured to receive light reflected by the image surface of the original and to convert the received light into an analog image signal; and a flexible plate configured to connect the light source to a voltage source not mounted on the frame for applying a driving voltage to the light source, said flexible plate including a first printed wire configured to apply a driving voltage to the light source, and including a second printed wire configured to establish a ground to the frame, wherein the driving voltage applied to the light source comprises a voltage having a pulse waveform.

2. The apparatus as defined in claim 1, wherein the second printed wire of the flexible plate is connected to the frame.

3. The apparatus as defined in claim 2, further comprising:

a supporting plate mounted to a position at which the flexible plate is fixed to the frame, and configured to support the flexible plate; and a grounding portion integrated with the second printed wire, and being wrapped around the supporting plate to cover a surface of the supporting plate facing the frame.

4. An image reading apparatus, comprising:

frame means for moving in a reciprocating fashion;

light emitting means held by the frame means and for emitting light so as to irradiate an image surface of an original;

photo-electronic converting means for receiving light reflected by the image surface of the original and for converting the received light into an analog image signal; and binding means for flexibly connecting the light emitting means to a voltage means not mounted on the frame means for applying a driving voltage, said binding means including a first printed wire for applying the driving voltage to the light emitting means, and including a second printed wire for establishing a ground to the frame means, wherein the driving voltage applied to the light emitting means comprises a voltage having a pulse waveform.

5. The apparatus as defined in claim 4, wherein the second printed wire of the binding means is connected to the frame means.

6. The apparatus as defined in claim 5, further comprising:

supporting means mounted to a position at which the binding means is fixed to the frame means, and for supporting the binding means; and grounding means integrated with the second printed wire, and being wrapped around the supporting means to cover a surface of the supporting means facing the frame means.

7. An image reading method, comprising:

moving a frame in a reciprocating fashion;

emitting light with a light source so as to irradiate an image surface of an original; and receiving light reflected by the image surface of the original and converting the received light into an analog image signal, wherein a flexible plate connects the light source to a voltage source not mounted on the frame for applying a driving voltage to the light source, said flexible plate including a first printed wire for applying the driving voltage to the light source, and including a second printed wire for establishing a ground to the frame, and wherein the driving voltage applied to the light source comprises a voltage having a pulse waveform.

8. The method as defined in claim 7, wherein the second printed wire of the flexible plate is connected to the frame.

9. The method as defined in claim 8, wherein the flexible plate is supported via a supporting plate mounted to a position at which the flexible plate is fixed to the frame, and wherein a grounding portion integrated with the second printed wire, is wrapped around the supporting plate to cover a surface of the supporting plate facing the frame.

* * * * *